(No Model.)
C. R. GROFF.
PROCESS OF PREPARING COFFEE COMPOUNDS.
No. 270,787. Patented Jan. 16, 1883.
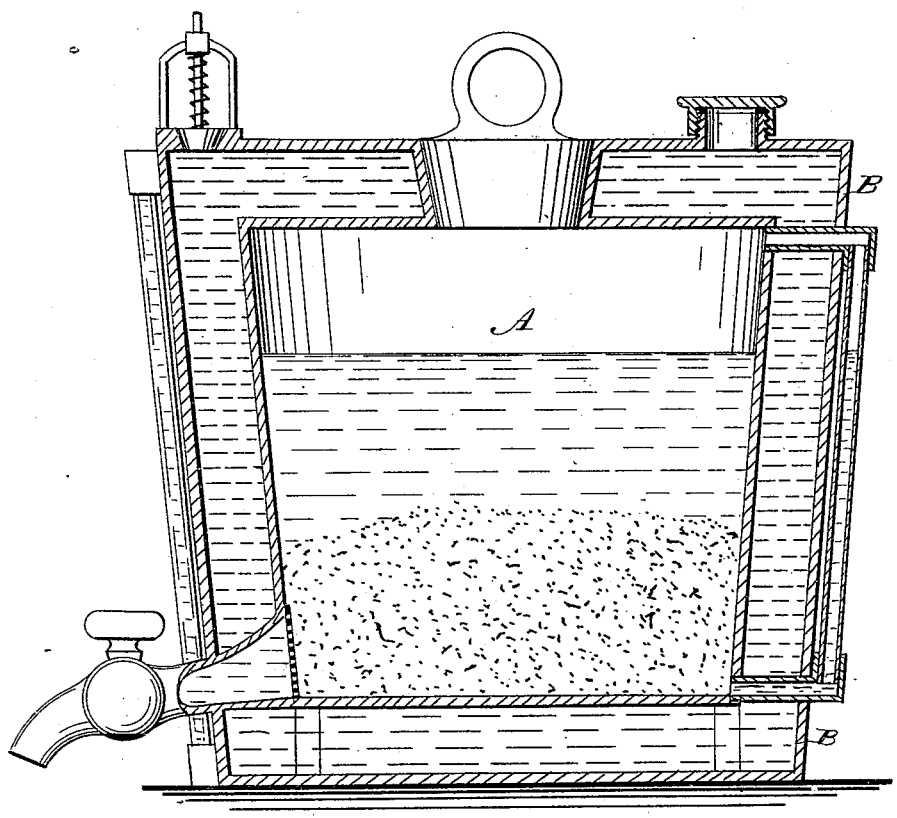
WITNESSES:
C. Neveux
C. Sedgwick
INVENTOR:
C. R. Groff
BY Munn & Co
ATTORNEYS.

UNITED STATES PATENT OFFICE.

CHARLES R. GROFF, OF ST. PAUL, MINNESOTA.

PROCESS OF PREPARING COFFEE COMPOUNDS.

SPECIFICATION forming part of Letters Patent No. 270,787, dated January 16, 1883.

Application filed April 29, 1882. (No model.)

*To all whom it may concern:*

Be it known that I, CHARLES R. GROFF, of Culina Mills, St. Paul, in the county of Ramsey and State of Minnesota, have invented a new and useful Improvement in Processes of Preparing Coffee Compounds, of which the following is a full, clear, and exact description.

Reference is to be had to the accompanying drawing, forming part of this specification, and which represents a sectional elevation of an apparatus suitable for carrying my invention into effect; but to such construction I make no claim in this application.

My invention has for its object an improved process for the production of a coffee compound that is not only economical and ready for immediate use as essence of coffee is now used, but that, being a highly-concentrated essence prepared with alcohol, in connection with certain other ingredients, and in the manner hereinafter fully described, in a close vessel, will have the full flavor of the berry and retain its strength and purity for a prolonged period of time.

In the preparation of the compound by my process the following ingredients are used, in or about the proportions stated, viz: coffee, roasted and ground, one pound; water, two quarts; alcohol or cologne spirits, one-half pint; glycerine, two ounces; burnt sugar or coloring, one ounce.

The mode of preparing the compound is as follows: The several materials of which it is composed are treated in a vessel, A, which may be closed by a plug or stopper, and which is inclosed within another close vessel, B, containing boiling water. In the vessel A, I first put the roasted and ground coffee—say one or more pounds, but which, for convenience' sake, will here be referred to as a single pound. To this pound of coffee I add two quarts of water and allow the same to boil or simmer in the vessel A until it is reduced to one quart. I then add half a pint of alcohol or cologne spirits and allow the whole to boil or simmer until the mass is reduced to about one quart, or, it may be, a little more, after which are introduced two ounces of glycerine and one ounce of burnt sugar or other suitable coloring material. The vessel A then being kept closed, the compound is retained therein until perfectly cooled, after which it is bottled for use or the market.

This compound prepared by above process is designed to be used in the place of coffee of any kind as ordinarily prepared, and as essences of coffee are now used. It may be produced upon a large scale, and, being of uniform quality, will be much superior to coffee as ordinarily prepared, and is suitable either for private, family, or more general use. Being prepared with alcohol, it is not liable to deteriorate by keeping. Furthermore, as the compound is a highly-concentrated essence, it will prove very economical. About two table-spoonfuls of the compound will make a cup of very best coffee. By boiling the coffee in a close vessel within a vessel containing boiling water or steam there is no liability to burn, and the entire strength of the coffee in liquid form is obtained, and after it has boiled two or three hours, by adding alcohol and simmering or boiling the mass until sufficiently reduced and adding the glycerine and coloring material, a highly-concentrated essence of coffee of superior keeping quality and good color is obtained.

I do not restrict my invention to the precise quantities of materials herein mentioned, and periods during which the coffee or coffee and alcohol are permitted to simmer or boil may be changed.

The process herein described may also be used for preparing other essences or beverages.

Having thus described my invention, I claim as new and desire to secure by Letters Patent—

The described process of preparing coffee, which consists in adding to the coffee water, which is allowed to boil or simmer, then adding to these alcohol or cologne spirits, the whole being permitted to boil or simmer, and finally introducing glycerine and burnt sugar, after which the same is allowed to cool and is bottled, the aforesaid ingredients being put in a vessel which is itself inclosed in another close vessel containing boiling water, as set forth.

CHARLES ROSOLVO GROFF.

Witnesses:
WILLIAM R. SPANGLER,
HIRAM F. STEVENS.